(12) United States Patent
McGovern et al.

(10) Patent No.: US 11,772,424 B2
(45) Date of Patent: Oct. 3, 2023

(54) SERVICEABLE NON-PNEUMATIC TIRE AND WHEEL ASSEMBLIES

(71) Applicant: Ford Global Technologies, LLC, Dearborn, MI (US)

(72) Inventors: James Brian McGovern, Detroit, MI (US); Wesley Grant Morris, Dearborn, MI (US); Adam Wirth, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 16/899,206

(22) Filed: Jun. 11, 2020

(65) Prior Publication Data

US 2020/0391553 A1 Dec. 17, 2020

Related U.S. Application Data

(60) Provisional application No. 62/861,351, filed on Jun. 14, 2019.

(51) Int. Cl.
*B60C 7/26* (2006.01)
*B60C 7/14* (2006.01)
(Continued)

(52) U.S. Cl.
CPC .............. *B60C 7/26* (2013.01); *B60B 21/026* (2013.01); *B60C 7/14* (2013.01); *B60C 7/143* (2013.01);
(Continued)

(58) Field of Classification Search
CPC .... B60C 7/24; B60C 7/26; B60C 7/28; B60C 7/14; B60C 7/143; B60C 7/146; B60C 2015/0245; B60B 2340/50; B60B 2900/541; B60B 21/026; B60B 9/04; B60B 9/26; B60B 21/102; B60B 21/023; B60B 21/04; B60B 21/104; B60B 21/106
See application file for complete search history.

(56) References Cited

U.S. PATENT DOCUMENTS 2,701,601 A * 2/1955 Sutter ...................... B60C 7/28
                                                          152/325
5,186,772 A * 2/1993 Nakasaki ................ B60C 15/06
                                                          152/522
(Continued)

FOREIGN PATENT DOCUMENTS

DE           3508084 A1 * 9/1986
DE    102016222303 A1 * 5/2018
(Continued)

*Primary Examiner* — Kip T Kotter
(74) *Attorney, Agent, or Firm* — Burris Law, PLLC

(57) ABSTRACT

A tire and wheel assembly includes a non-pneumatic tire and a wheel. The non-pneumatic tire incudes a tread, an inner liner, and a plurality of spokes extending between and coupling the tread to the inner liner. The plurality of spokes have a first width and the inner liner has a second width greater than the first width such that a pair of inner liner flanges extend beyond the plurality of spokes in an axial direction. The wheel includes a rim and the inner liner is configured to be mounted on the rim with the pair of inner liner flanges fastened to the rim such that the non-pneumatic tire is serviceably mounted on the wheel.

9 Claims, 3 Drawing Sheets

(51) Int. Cl.
*B60B 21/02* (2006.01)
*B60B 9/04* (2006.01)
*B60B 9/26* (2006.01)

(52) U.S. Cl.
CPC . *B60B 9/04* (2013.01); *B60B 9/26* (2013.01); *B60B 2340/50* (2013.01); *B60B 2900/541* (2013.01); *B60C 7/146* (2021.08)

(56) References Cited

U.S. PATENT DOCUMENTS

| | | |
|---|---|---|
| 9,290,053 B2 | 3/2016 | Choi et al. |
| 2010/0175801 A1* | 7/2010 | Mani ............... B60B 21/102 |
| | | 152/539 |
| 2011/0132511 A1* | 6/2011 | Pringiers ............. B60C 7/22 |
| | | 152/323 |
| 2011/0240193 A1* | 10/2011 | Matsuda ......... B29D 30/0681 |
| | | 156/112 |
| 2013/0234497 A1* | 9/2013 | Franklin .......... B60C 15/0226 |
| | | 301/37.24 |
| 2016/0297244 A1* | 10/2016 | Abe ................... B60C 7/18 |
| 2017/0297372 A1 | 10/2017 | Talbot et al. |
| 2017/0349005 A1* | 12/2017 | Costlow ............. B60C 7/26 |
| 2018/0029419 A1 | 2/2018 | Kim et al. |

FOREIGN PATENT DOCUMENTS

| | | | | |
|---|---|---|---|---|
| EP | 159888 A | * | 10/1985 | ......... B60C 15/0213 |
| FR | 419880 A | * | 1/1911 | |
| KR | 820000294 B1 | * | 3/1982 | |
| KR | 20110055479 A | * | 5/2011 | |
| WO | WO-2004024470 A1 | * | 3/2004 | ............... B60C 7/00 |

\* cited by examiner

SERVICEABLE NON-PNEUMATIC TIRE AND WHEEL ASSEMBLIES

CROSS-REFERENCE TO RELATED APPLICATIONS

This application claims priority to U.S. provisional application No. 62/861,351 filed on Jun. 14, 2019. The disclosure of the above application is incorporated herein by reference.

FIELD

The present disclosure relates to tires, and more particularly to the design aspects and performance features of non-pneumatic tires.

BACKGROUND

The statements in this section merely provide background information related to the present disclosure and may not constitute prior art.

Non-pneumatic tires are increasingly attractive for the next generation of passenger vehicles. Non-pneumatic tires rely on the use of polymeric spokes rather than compressed gas (e.g., compressed air) to provide support to the vehicle. The polymeric spokes connect a tread of the non-pneumatic tire to a wheel and transfer the load from the ground to the wheel and wheel hub area of a vehicle. Also, current designs rely on adhesives to bond the polymeric spokes to the wheel since the polymeric spokes and the wheel are manufactured from different materials.

The present disclosure addresses the issues of connecting non-pneumatic tires to wheels or wheel hubs, among other issues related to non-pneumatic tires.

SUMMARY

This section provides a general summary of the disclosure and is not a comprehensive disclosure of its full scope or all of its features.

In one form of the present disclosure, a tire and wheel assembly includes a non-pneumatic tire with a tread, an inner liner, and a plurality of spokes extending between the tread and the inner liner. The plurality of spokes have a first width and the inner liner has a second width greater than the first width such that a pair of inner liner flanges extend beyond the plurality of spokes in an axial direction. The tire and wheel assembly also includes a wheel with a rim comprising an outer surface and the inner liner is configured to be mounted and attached on the rim of the wheel such that the non-pneumatic tire is serviceably mounted on the wheel.

In some variations, the rim of the wheel comprises a retention flange extending outwardly from the outer surface. In at least one variation, at least one of the pair of inner liner flanges is fastened to the rim with a fastening mechanism selected from at least one of a press fit, at least one fastening band, at least one threaded fastener, and at least one ridged fastener. In such variations, the fastening mechanism can be a pair of fastening bands and the pair of inner liner flanges are fastened to the rim with the pair of fastening bands. Also, the pair of fastening bands radially compress the pair of inner liner flanges onto the rim.

In at least one variation, the rim comprises at least one circumferential groove and at least one of the pair of inner liner flanges is disposed at least partially within the at least one circumferential groove. In such variations, at least one fastening band that compress the at least one of the pair of inner liner flanges into the at least one circumferential groove can be included.

In some variations, the rim comprises a pair of circumferential grooves and the pair of inner liner flanges are disposed at least partially within the pair of circumferential grooves. In such variations, a pair of fastening bands that radially compress the pair of inner liner flanges into the pair of circumferential grooves can be included.

In at least one variation, at least one threaded fastener extending through apertures in at least one of the pair of inner liner flanges and the rim included. For example, the at least one threaded fastener can be a plurality of threaded fasteners extending through apertures in the pair of inner liner flanges and the rim.

In some variations, the rim comprises a retention flange that extends across at least a portion of one of the pair of inner liner flanges. In such variations, a locking ring can be included and the locking ring fastens another of the pair of inner liner flanges to the rim. In at least one variation, the rim comprises a retention flange that extends across at least a portion of one of the pair of inner liner flanges and a locking ring fastening another of the pair of inner liner flanges to the rim.

In some variations, the rim of the wheel comprises a first side and a second side, and a retention flange positioned at the first side and extending outwardly from the outer surface such that the inner liner of the non-pneumatic tire is configured to slide onto and across the outer surface of the rim until the inner liner abuts against the retention flange.

In another form of the present disclosure, a wheel for a non-pneumatic tire includes a rim with a first side, a second side, an outer surface extending from the first side to the second side, and a retention flange positioned at the first side and extending outwardly from the outer surface. The rim is configured for an inner liner of a non-pneumatic tire to slide onto and across the outer surface of the rim until the inner liner abuts against the retention flange. In some variations, at least one of the first side and the second side of the rim comprises a circumferential groove configured for the inner liner to be disposed at least partially within the circumferential groove. In at least one variation, at least one of the first side and the second side of the rim comprises at least one aperture configured to receive a threaded fastener.

In still another form of the present disclosure a method of serviceably mounting a non-pneumatic tire to a wheel includes mounting the non-pneumatic tire onto a rim of the wheel. The non-pneumatic tire comprises a tread, an inner liner, a plurality of spokes extending between the tread and the inner liner, and the plurality of spokes have a first width and the inner liner has a second width greater than the first width such that a pair of inner liner flanges extend beyond the plurality of spokes in an axial direction. The rim of the wheel includes a first side, a second side, an outer surface extending from the first side to the second side, and a retention flange positioned at the first side and extending outwardly from the outer surface. Also, mounting the non-pneumatic tire onto the rim of the wheel comprises sliding the inner liner of the non-pneumatic onto and across the outer surface of the rim until the inner liner abuts against the retention flange.

In some variations, the method further includes fastening at least one of the pair of inner liner flanges the rim with a fastening mechanism selected from the group consisting of at least one fastening band, at least one threaded fastener, and at least one ridged fastener.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
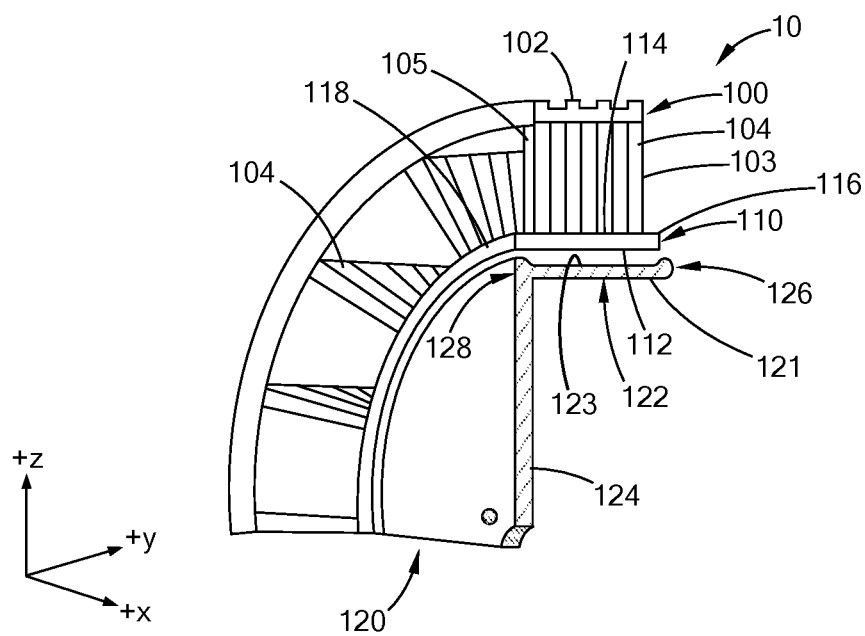
FIG. 1 is a partial cutaway perspective view of a section of a tire and wheel assembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
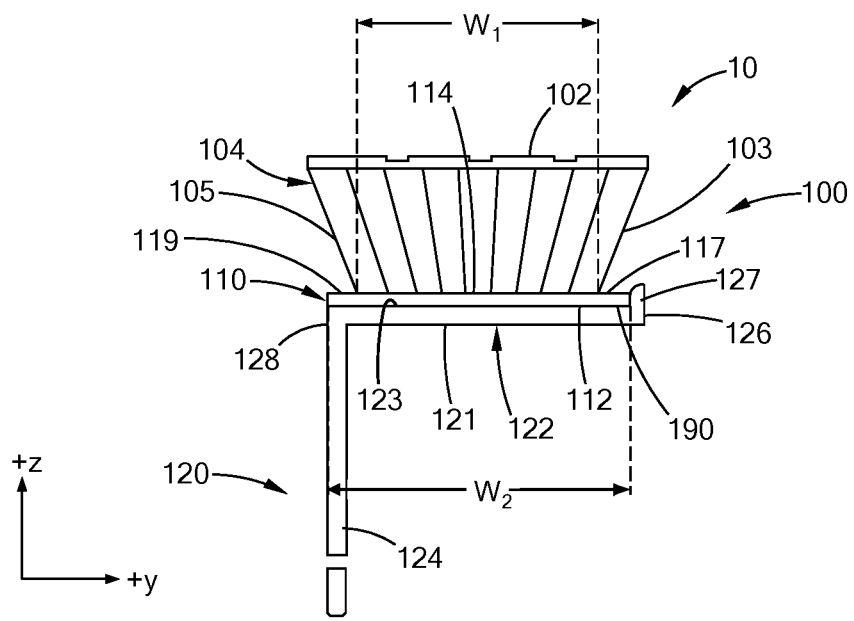
FIG. 2 is a side view of the tire and wheel assembly according in FIG. 1 according to one form of the present disclosure.

Referring now to FIGS. 1 and 2, a perspective view of a section of a tire and wheel assembly 10 according to the teachings of the present disclosure is shown in FIG. 1 and a front view (x-direction) of FIG. 1 is shown in FIG. 2. The tire and wheel assembly 10 includes a non-pneumatic tire 100 and a wheel 120. As used herein the term "wheel" refers to a wheel (e.g., a mag wheel or an alloy wheel) or wheel hub. The non-pneumatic tire 100 includes a tread 102 (102''' in FIG. 6), a plurality of spokes 104 (also referred to herein simply as "spokes"), and an inner liner 110 (110' in FIG. 4, 110'' in FIG. 5, 110''' in FIG. 6, collectively "inner liner 110"). The plurality of spokes 104 (104''' in FIG. 6) have a first side 103 (e.g., an inboard side) (103''' in FIG. 6), a second side 105 (e.g., an outboard side) (105''' in FIG. 6), and extend between the tread 102 and inner liner 110 (the inner liner 110 is spaced outwardly apart from the wheel 120 in FIG. 1 for clarity). That is, the plurality of spokes 104 are joined to and provide a mechanical connection between the tread 102 and inner liner 110. Also, the plurality of spokes 104 have a first width W1' where the spokes 104 are joined to the inner liner 110.

The inner liner 110 is defined by an inner surface 112 (112' in FIG. 4, 112'' in FIG. 5, 112''' in FIG. 6), an outer surface 114 (114' in FIG. 4, 114''' in FIG. 6), a first side 116 (e.g., an inboard side), and a second side 118 (e.g., an outboard side). As used herein, the terms "inner", "inward", "outer" and "outward" refer to a radial position or direction relative to a center axis (parallel to y-axis, not shown) of the wheel 120.

Also, the phrase "inboard side" refers to a side or an object located proximal to a vehicle brake or engine/motor relative to an "outboard side" of the object located distal to the vehicle brake or engine/motor relative to the inboard side. The inner liner 110 has a second width 'W2' greater than the first width W1 of the spokes 104 such that a first inner liner flange 117 extends beyond (+y-direction) the spokes 104 and a second inner liner flange 119 extends beyond (−y-direction) the spokes 104 in an axial direction (y-direction). That is, the first inner liner flange 117 extends between the spokes 104 and the first side 116 of the inner liner 110, and the second inner liner flange 119 extends between the spokes 104 and the second side 118 of the inner liner 110.

The wheel 120 includes a rim 122 defined by an inner surface 121 (121' in FIG. 4, 121'' in FIG. 5, 121''' in FIG. 6), an outer surface 123 (123''' in FIG. 6), a first side 126 (e.g., an inboard side) (126'' in FIG. 5, 126''' in FIG. 6) and a second side 128 (e.g., an outboard side) (128'' in FIG. 5, 128''' in FIG. 6), and the rim 122 extends from a wheel wall 124. While FIGS. 1 and 2 show the wheel wall 124 joined to the rim 122 at or proximal to the second side 128, it should be understood that the wheel wall 124 can be joined to the rim 122 a different locations, for example at or proximal to the first side 126 of the rim 122 or at a position between the first side 126 and the second side 128. It should also be understood that the wheel 120 can include more than one wheel wall 124 joined to the rim 122 (not shown).

In some variations of the present disclosure, the rim 122 includes a retention flange 127 (127'' in FIG. 5) positioned at the first side 126 and extending outwardly from the outer surface 123. In such variations, the retention flange 127 is configured to allow the inner liner 110 to slide onto and across (+y-direction) the outer surface 123 of the rim 122 until the first inner liner flange 117 of the inner liner 110 abuts against the retention flange 127. In at least one variation, the retention flange 127 is a continuous retention flange 127 extending outwardly along the circumference of the rim 122, while in other variations the retention flange 127 is a plurality of discrete retention tabs 127 positioned extending outwardly along the circumference of the rim 122. It should be understood that the retention flange 127 (or retention tabs) can assist in mounting and alignment of the non-pneumatic tire 100 on the wheel 120.

In some variations of the present disclosure the inner liner 110 and the rim 122 are dimensioned (e.g., the inner liner 110 has an inner diameter and the rim 122 has an outer diameter) such that an interference fit is provided between the inner liner 110 and the rim 122, and the non-pneumatic tire 100 is serviceably mounted on the wheel 120 by sliding the inner liner 110 over and onto rim 122 (FIG. 2). In such variations, a barrier or film 190 of either adhesive or lubricant nature (e.g., an adhesive or a lubricant) can be included between the outer surface 123 of the rim 122 and the inner surface 112 of the inner liner 110. As used herein, the phrase "serviceably mounted" refers to being securely and removably mounted or attached to an object. That is, the non-pneumatic tire 100 can be mounted to the wheel 120, removed, mounted onto the wheel 120 again, and/or replaced with another non-pneumatic tire 100 at a vehicle dealership, vehicle service station, among others.

Figure 3:
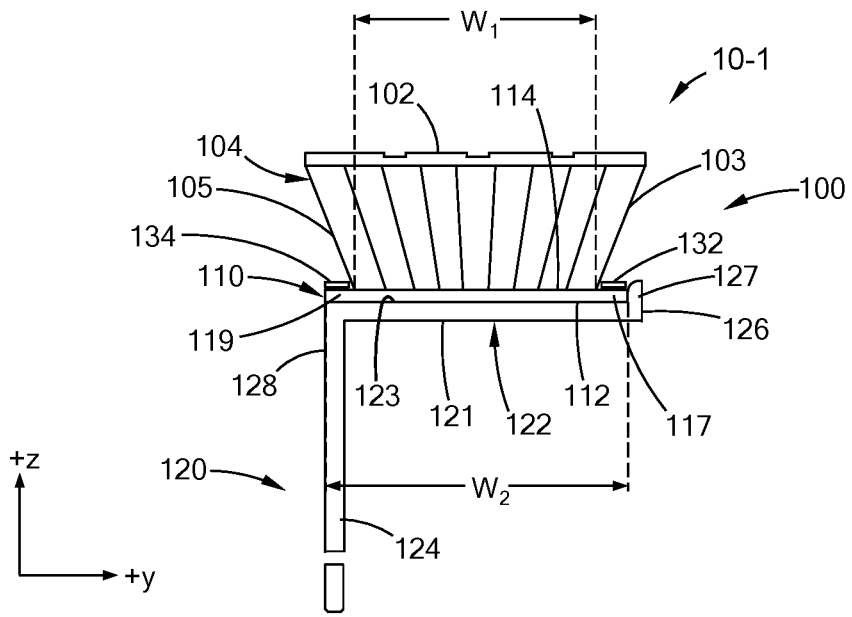
FIG. 3 is a side view of the tire and wheel assembly in FIG. 1 according to another form of the present disclosure.

In other variations of the present disclosure, the non-pneumatic tire 100 is serviceably mounted on the wheel 120 using a fastening mechanism. For example, one non-limiting example of the non-pneumatic tire 100 serviceably mounted on the wheel 120 using at least one fastener is shown in the tire and wheel assembly 10-1 of FIG. 3. Particularly, the tire and wheel assembly 10-1 includes a fastening mechanism in the form of a first fastening band 132 and a second fastening band 134 (collectively referred herein as a "pair of fastening bands") for serviceably mounting the non-pneumatic tire 100 on the wheel 120. In some variations, the pair of fastening bands 132, 134 radially compress the first inner liner flange 117 and the second inner liner flange 119, respectively, (collectively referred to herein as a "pair of inner liner flanges") onto the rim 122 after being placed and/or tightened onto the pair of inner liner flanges 117, 119. In such variations the pair of fastening bands 132, 134 can include a mechanical tightening mechanism (e.g., a screw mechanism) that reduces the circumferential length of the fastening bands 132, 134. In the alternative, or in addition to, the pair of fastening bands 132, 134 can be made from a material or combination of materials with an elasticity and strength such that the pair of fastening bands 132, 134 are elastically stretched, placed onto the pair of inner liner flanges 117, 119, and released such that a radially compressive force is exerted on and between the pair of inner liner flanges 117, 119 and the rim 122 and the non-pneumatic tire 100 is serviceably mounted to the wheel 120. While FIG. 3 depicts a pair of fastening bands 132, 134, it should be understood that a tire and wheel assembly 10-1 with only one fastening band or more than two fastening bands is included within the teachings of the present disclosure.

Figure 4:
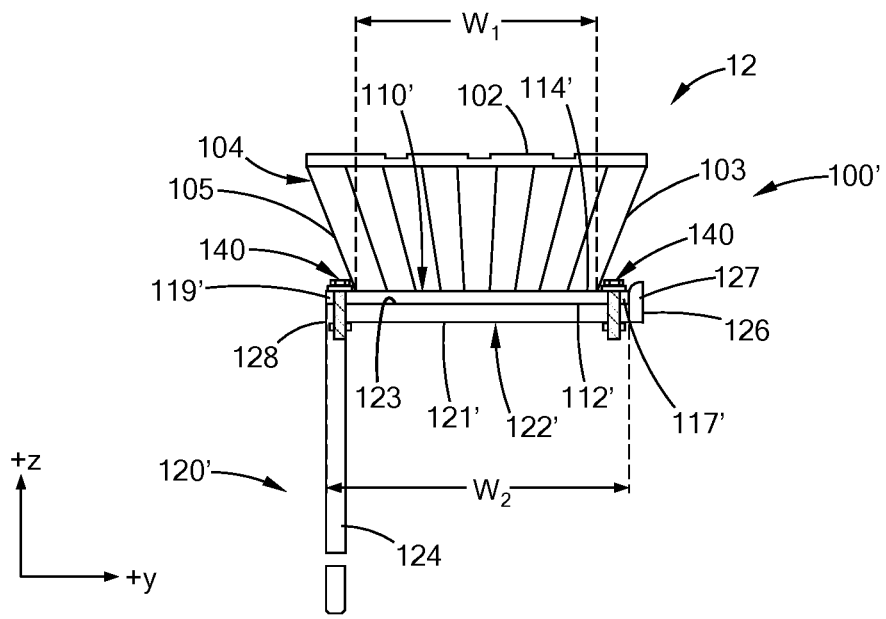
FIG. 4 is a side view of the tire and wheel assembly in FIG. 1 according to yet another form of the present disclosure.

Referring now to FIG. 4, in some variations of the present disclosure a tire and wheel assembly 12 with the non-pneumatic tire 100 and the wheel 120' includes a fastening mechanism in the form of a plurality of threaded, press fit, or ridged fasteners 140 (e.g., a plurality of bolts and nuts). Particularly, the threaded fasteners 140 extend through apertures (not shown) in the pair of inner liner flanges 117', 119' and the rim 122', and are "tightened" such that a compressive force is applied onto and between the pair of inner liner flanges 117', 119' and the rim 122'. The threaded fasteners 140 can be removed (e.g., unscrewed) such that the non-pneumatic tire 100 can be removed from the rim 122, thereby providing the non-pneumatic tire 100 to be mounted onto the wheel 120' again and/or replaced with another non-pneumatic tire 100.

Figure 5:
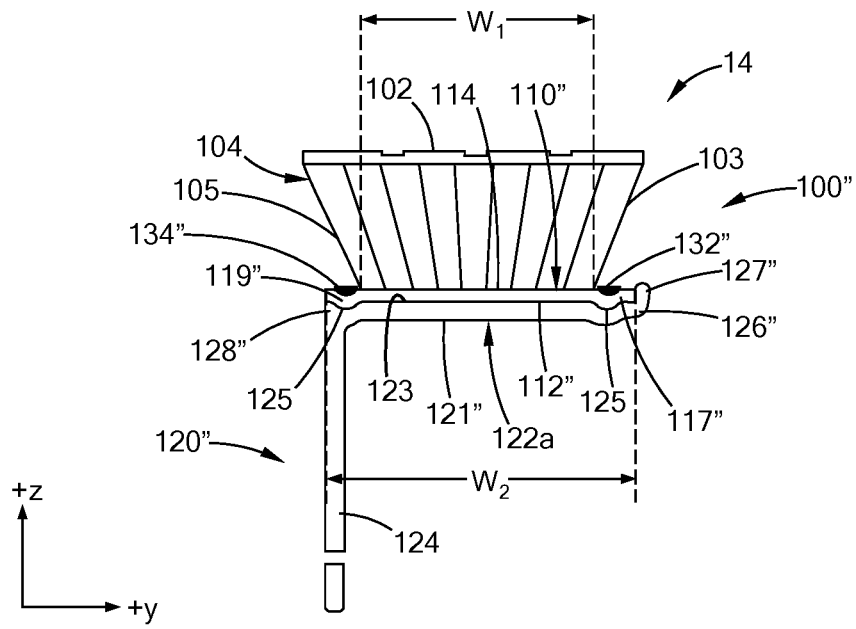
FIG. 5 is a side view of the tire and wheel assembly in FIG. 1 according to still yet another form of the present disclosure.

Referring now to FIG. 5, in some variations of the present disclosure, a tire and wheel assembly 14 with the non-pneumatic tire 100" and the wheel 120" includes a rim 122a with a pair of grooves 125 extending inwardly from the outer surface 123 of the rim 122a. In such variations, the pair of inner liner flanges 117", 119" are at least partially disposed in the pair of grooves 125 as shown in FIG. 5. In at least one variation, the pair of inner liner flanges 117", 119" are preformed with ridges (not labeled) that fit within the pair of grooves 125. In the alternative, or in addition to, the pair of fastening bands 132", 134" are placed onto the pair of inner liner flanges 117", 119" such that a compressive force conforms the pair of inner liner flanges 117", 119" to the pair of grooves 125 as shown in FIG. 5. While FIG. 5 depicts a pair of grooves 125, it should be understood that a tire and wheel assembly 14 within only one groove or more than two grooves is included within the teachings of the present disclosure.

Figure 6:
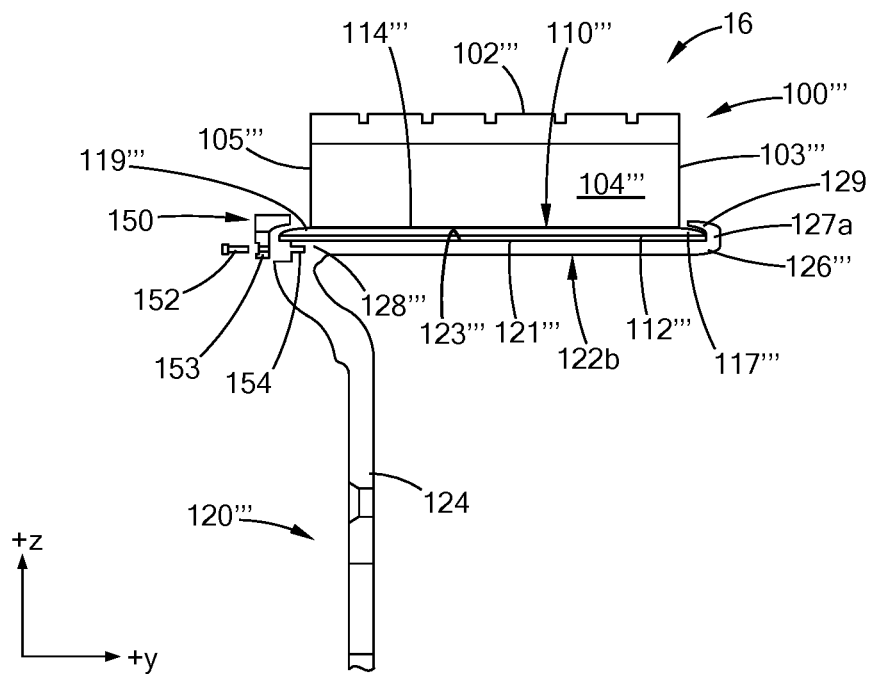
FIG. 6 is a side view of the tire and wheel assembly in FIG. 1 according to another form of the present disclosure.

Referring now to FIG. 6, in some variations of the present disclosure, a tire and wheel assembly 16 with the non-pneumatic tire 100''' and the wheel 120''' includes a rim 122b with a retention flange 127a that overlaps the inner liner 110'''. For example, and as shown in FIG. 6, the retention flange 127a is j-shaped with a ledge 129 that extends over (+z-direction) and across (y-direction) at least a portion of the inner liner flange 117'''. Similar to the retention flange 127 discussed above, in some variations the retention flange 127a is a continuous retention flange 127a extending outwardly along the circumference of the rim 122b, while in other variations the retention flange 127a is a plurality of discrete retention tabs 127a positioned and extending outwardly along the circumference of the rim 122b. A locking ring 150 that extends over and across the inner liner flange 119''' can be included and rigidly attached to the rim 122b with a fastener 152. For example, the fastener 152 can be threaded fastener (e.g., a bolt or screw) that extends through an aperture 153 in the locking ring 150 and threadingly engages (screws into) a threaded aperture 154 in the second side 128''' of the rim 122b. And similar to the retention flange 127a, in some variations the locking ring 150 is a continuous locking ring 150 along the circumference of the rim 122b, while in other variations the locking ring 150 is a plurality of discrete locking tabs 150 positioned and attached along the circumference of the rim 122b. Accordingly, the non-pneumatic tire 100''' can be serviceably mounted onto the wheel 120''' by sliding the inner liner 110''' onto the rim 122b until the inner liner flange 117''' slides under and abuts against the retention flange 127a, e.g., abuts against the flange and compresses the elastomeric flange material laterally and/or radially to prevent movement of the tire relative to the wheel, followed by rigidly attaching the locking ring 150 (or locking tabs 150) to the rim 122b.

It should be understood that the inner liner 110 is made from materials, fibers, plies, among others, such that desired properties of the inner liner 110 are provided. Non-limiting examples of desired properties include strength, ductility, stiffness, friction coefficient, and corrosion resistance, among others. Non-limiting examples of materials used to make the inner liner 110 include reinforced elastomers such as Styrene-butadiene rubber (SBR), butadiene rubber (BR), natural rubber (NR), ethylene propylene diene monomer (EPDM), butyl rubber, chloro-butyl rubber, bromo-butyl rubber, thermoplastic elastomer (TPE), and functionalized versions of all of the previously named rubber polymers. These materials may be reinforced with nylon, polyester, aramid, steel, glass fiber, carbon fiber or other ply material (s).

The plurality of spokes 104 are joined to the tread 102 and the inner liner 110 using known methods or techniques such as welding, adhesives, mechanical fasteners, and the like. Also, the plurality of spokes 104 can be molded and/or 3D printed onto or as part of the tread 102 and/or inner liner 110.

During servicing of the tire and wheel assemblies 10, 12, 14, 16, the non-pneumatic tire 100 is removed from the wheel 120, for example by using a tire changing machine (not shown) with a lever that pries and/or pulls the non-pneumatic tire 100 in the +y or −y direction shown in the figures. The same non-pneumatic tire 100, or another non-pneumatic tire (not shown), is then serviceably mounted onto the wheel 120, for example by using the same tire changing machine and pushing the inner liner 110 in the −y or +y direction until the inner liner 110 is positioned on the wheel 120 and abuts against the retention flange 127, 127a. Then an adhesive film 190, fastening bands 132, 134, threaded fasteners 140 and/or locking ring 150 can be used to assist in securing the inner liner 110 onto the rim 122, 122a, 122b.

While the inner liner and wheel discussed above have been described in relation to non-pneumatic tires, it should be understood that such parts, variations, features, techniques and the like may be employed with other types of tires and the present disclosure is not necessarily limited to non-pneumatic tires. It should also be understood that tire and wheel assemblies disclosed herein include combinations of the variations discussed in FIGS. 1-6. For example, a tire and wheel assembly according to the teachings of the present disclosure, can include a rim with or without a retention flange and/or one or more grooves, and one or more of fastening bands, threaded fasteners, and/or locking ring.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tire and wheel assembly comprising:
   a non-pneumatic tire with a tread, an inner liner defining an inner surface extending about a circumference of the inner liner, and a plurality of spokes extending between the tread and the inner liner, wherein the plurality of spokes have a first width and the inner liner has a second width greater than the first width such that a pair of inner liner flanges extend beyond the plurality of spokes in opposite axial directions, a first inner liner flange of the pair of inner liner flanges extending in a first axial direction and a second inner liner flange of the pair of inner liner flanges extending in a second axial direction, the inner liner extending along the second width;
   a wheel with a one-piece rim comprising a first side, a second side, an outer surface, a continuous retention flange, and a first circumferential groove, wherein the outer surface extends from the first side to the second side and around a circumference of the rim, wherein the continuous retention flange extends outwardly from the outer surface at the first side, wherein the first circumferential groove is recessed radially inward from the outer surface and bordered in the first axial direction and the second axial direction by the outer surface; and
   a first fastening band axially aligned with the first circumferential groove and radially compressing a portion of the second inner liner flange into the first circumferential groove,
   wherein the inner liner of the non-pneumatic tire is configured to slide onto and across the outer surface of the rim until the first inner liner flange abuts against the retention flange,
   wherein the second inner liner flange extends in the second axial direction beyond the first circumferential groove.

2. The tire and wheel assembly according to claim 1, wherein at least one of the pair of inner liner flanges is fastened to the rim with a press fit.

3. The tire and wheel assembly according to claim 1, wherein the rim comprises a second circumferential groove and a second fastening band, wherein the second circumferential groove is recessed radially inward from the outer surface and bordered in the first axial direction and the second axial direction by the outer surface, wherein the second fastening band is axially aligned with the second circumferential groove and radially compresses a portion of the first inner liner flange into the second circumferential groove.

4. The tire and assembly according to claim 1, wherein the continuous retention flange extends across at least a portion of the first inner liner flange.

5. The tire and assembly according to claim 4 further comprising a locking ring, wherein the locking ring fastens the second inner liner flange to the rim.

6. The tire and assembly according to claim 1, wherein the continuous retention flange extends across at least a portion of the first inner liner flange and the rim further comprises a locking ring fastening the second inner liner flange to the rim.

7. A wheel for a non-pneumatic tire comprising:
   a one-piece rim comprising a first side, a second side, an outer surface, a first circumferential groove, and a second circumferential groove, the outer surface extending from the first circumferential groove to the second circumferential groove, the first side extending about a circumference of the rim and axially adjacent the first circumferential groove, the first circumferential groove being recessed radially inward from the outer surface and a radially outwardmost surface of the first side, the second circumferential groove being axially adjacent the second side and recessed radially inward from the outer surface and a radially outwardmost surface of the second side, and
   a continuous retention flange positioned at the first side and extending radially outwardly from the radially outwardmost surface of the first side and extending around the circumference of the rim, wherein a radially outwardmost surface of the retention flange is radially outward of an entirety of the second side and the second side defines an axially terminal end of the one-piece rim,
   wherein the radially outwardmost surface forms an edge with an axial surface that faces in an axial direction of the wheel that is away from first side of the one piece rim, and
   wherein the radially outwardmost surface of the second side is substantially the same diameter as the outer surface.

8. A method of serviceably mounting a non-pneumatic tire to a wheel, the non-pneumatic tire comprising a tread, an inner liner, and a plurality of spokes extending between the tread and the inner liner, wherein the plurality of spokes have a first width and the inner liner has a second width greater than the first width such that a first inner liner flange extends in a first axial direction beyond the plurality of spokes and a second inner liner flange extends in a second axial direction beyond the plurality of spokes, the wheel comprising a one-piece rim comprising a first side, a second side, an outer surface, a continuous retention flange, and a first circumferential groove, wherein the outer surface extends from the first side to the second side and around a circumference of the rim, wherein the continuous retention flange extends outwardly from the outer surface at the first side, wherein the first circumferential groove is recessed radially inward from the outer surface and bordered in the first axial direction and the second axial direction by the outer surface, the method comprising:
   sliding the inner liner of the non-pneumatic tire in the first axial direction onto and across the outer surface of the rim until the first inner liner flange abuts against the retention flange and the second inner liner flange axially overlaps the first circumferential groove while extending in the second axial direction beyond the first circumferential groove; and fastening a first fastening band so that the first fastening band is axially aligned with the first circumferential groove and radially compresses a portion of the second inner liner flange into the first circumferential groove.

9. The method according to claim 8 further comprising fastening the first inner liner flange to the rim with a second fastening band so that the second fastening band is axially aligned with a second circumferential groove of the rim and radially compresses a portion of the first inner liner flange into the second circumferential groove.

\* \* \* \* \*